(12) United States Patent
Bontjer et al.

(10) Patent No.: US 11,470,873 B2
(45) Date of Patent: Oct. 18, 2022

(54) METHOD AND DEVICE FOR SUBJECTING CO-EXTRUDED FOOD PRODUCTS TO AN AIRFLOW IN TWO PHASES

(71) Applicant: Marel Meat B.V., Boxmeer (NL)

(72) Inventors: Marcus Bernhard Hubert Bontjer, Aarle Rixtel (NL); Sigebertus Johannes Jacobus Jozef Meggelaars, Eindhoven (NL); Paulus Johanus Maria Thoonsen, Vught (NL); Kasper Willem Van Den Berg, Oss (NL)

(73) Assignee: MAREL MEAT B.V., Boxmeer (NL)

( * ) Notice: Subject to any disclaimer, the term of this patent is extended or adjusted under 35 U.S.C. 154(b) by 58 days.

(21) Appl. No.: 14/702,092

(22) Filed: May 1, 2015

(65) Prior Publication Data
US 2015/0230514 A1 Aug. 20, 2015

Related U.S. Application Data

(63) Continuation-in-part of application No. 12/066,467, filed as application No. PCT/NL2006/050205 on Aug. 21, 2006, now abandoned.

(30) Foreign Application Priority Data

Sep. 12, 2005 (NL) ...................................... 1029931

(51) Int. Cl.
*A23P 30/20* (2016.01)
*A23P 30/25* (2016.01)
(Continued)

(52) U.S. Cl.
CPC ............ *A23P 30/25* (2016.08); *A22C 11/001* (2013.01); *A23B 4/0053* (2013.01); *A23B 4/048* (2013.01); *A23L 3/42* (2013.01); *A23L 13/03* (2016.08)

(58) Field of Classification Search
CPC ....... A22C 11/001; A22C 11/00; A22C 11/03; A22C 11/003; A22C 11/005; A22C 11/006; A22C 11/008; A22C 15/00; A22C 15/001; A22C 15/007; A22C 15/008; A22C 18/00; A23P 1/125; A23P 30/25; A23P 20/10;
(Continued)

(56) References Cited

U.S. PATENT DOCUMENTS 3,622,353 A * 11/1971 Bradshaw .......... A22C 13/0006
426/284
5,601,864 A 2/1997 Mitchell
(Continued)

FOREIGN PATENT DOCUMENTS

NL 1007039 C 3/1999
WO WO95/28090 A 10/1995
WO WO99/55165 A 11/1999

*Primary Examiner* — Bryan Kim
(74) *Attorney, Agent, or Firm* — Workman Nydegger

(57) ABSTRACT

The invention relates to a method for manufacturing co-extruded food products, comprising the processing steps of: A) co-extruding an elongate dough strand and a casing enclosing the elongate dough strand to form a non-coagulated food product, B) bringing the casing into contact with a salt solution, and C) dividing the encased elongate food strand into individual products, whereafter the co-extruded food products are subjected to an airflow. The invention also relates to a device for manufacturing co-extruded food products.

14 Claims, 2 Drawing Sheets

(51) Int. Cl.
*A22C 11/00* (2006.01)
*A23B 4/005* (2006.01)
*A23B 4/048* (2006.01)
*A23L 3/42* (2006.01)
*A23L 13/00* (2016.01)

(58) Field of Classification Search
CPC ......... A23P 20/105; A23P 20/11; A23P 20/15; A23P 20/17; A23P 20/18; A23L 13/50; A23L 13/52; A23L 13/60; A23L 13/62; A23L 13/65; A23L 3/16; A23L 3/165; A23L 3/18; A23L 3/185; A23L 3/40; A23L 3/42; A23B 4/0053; A23B 4/041; A23B 4/044; A23B 4/048
See application file for complete search history.

(56) References Cited

U.S. PATENT DOCUMENTS

| | | |
|---|---|---|
| 5,695,800 A | 12/1997 | Merritt, II |
| 5,759,602 A | 6/1998 | Kobussen et al. |
| 5,811,146 A * | 9/1998 | Marra ............ A23L 13/67 426/513 |
| 6,419,968 B1 * | 7/2002 | Wang ............ A22C 13/0016 426/277 |
| 6,471,042 B1 * | 10/2002 | Van De Dungen .. A22C 11/001 198/703 |
| 7,357,953 B1 * | 4/2008 | Van Den Dungen ............ A22C 11/001 426/465 |
| 2004/0023611 A1 * | 2/2004 | Van Der Post ......... F26B 15/14 452/30 |
| 2004/0025366 A1 | 2/2004 | Soucy |
| 2005/0053697 A1 * | 3/2005 | Moore ............ A23P 30/20 426/93 |
| 2005/0139203 A1 * | 6/2005 | Jones ............ A21B 1/245 126/21 A |

* cited by examiner

METHOD AND DEVICE FOR SUBJECTING CO-EXTRUDED FOOD PRODUCTS TO AN AIRFLOW IN TWO PHASES

CROSS REFERENCE TO A RELATED APPLICATION

This application is a continuation-in-part of U.S. patent application Ser. No. 12/066,467 filed Apr. 11, 2008, which is the National Stage of International Application No. PCT/NL2006/050205, filed Aug. 21, 2006.

BACKGROUND OF INVENTION

Method and device for subjecting co-extruded food products to an airflow in two phases The present invention relates to a method for manufacturing co-extruded food products, comprising the processing steps of: A) co-extruding an elongate dough strand and a casing enclosing the elongate dough strand to form a non-coagulated food product, B) bringing the casing into contact with a salt solution, and C) dividing the encased elongate food strand into individual products, whereafter the co-extruded food products are subjected to an airflow. The invention also relates to a device for manufacturing co-extruded food products, comprising: co-extrusion means for simultaneously manufacturing an elongate dough strand and a casing enclosing the elongate dough strand, supply means for supplying a salt solution to the co-extruded food product, separating means for dividing the encased elongate food product into individual products, and drying means provided with a means for generating an airflow disposed in a drying space.

In the co-extrusion of food products dough is extruded from a nozzle such that an elongate dough strand is formed. Simultaneously with the extrusion of the dough strand a skin (casing) is arranged, likewise by means of the extrusion, around the dough strand of a material suitable for this purpose, usually a collagen mixture or an alginate mixture. Food products (in particular sausages) are thus manufactured by means of the simultaneous extrusion (co-extrusion). The food products usually consist of meat products, but it is also possible to manufacture vegetarian products with a non-animal casing in this manner. The material with which the casing is manufactured is viscous immediately after arranging thereof around the dough strand. In order to give the casing some strength so that subsequent treatment and process steps are possible, it is desirable to extract water from the casing as quickly as possible such that it obtains a mechanical strength. For this purpose the casing is usually brought into contact with a salt solution immediately after extrusion so as to have the casing acquire a stronger structure; such a process of strengthening the casing can for instance consist of precipitation, "cross-linking" and/or gelling (this latter process takes place particularly in the case of an alginate mixture). Following the first strengthening process, the extrusion product can be divided up ("brought to length") by a separator, for instance a crimper or a linker. After separation the divided extrusion products are usually placed in a drying space where the casing is stabilized further by means of drying. After drying, the products can be taken out of the drying space and, in the case of preparation of smoked food products, brought into contact with a smoke extract or natural smoke. It can occur that the thus smoked food products are then fed back again to the drying space for further stabilization of the products. Such a process is described inter alia in NL 1007039. The prior art drying means are very voluminous and consume much energy. This results in a normal duration of stay in the drying means of about 24 minutes for an extrusion product with a diameter of 24 mm, this at a temperature usually lying between 65° C. and 90° C.

U.S. Pat. No. 6,419,968 describes a method and apparatus for producing sausages, wherein sausage paste and collagen in coextruded to form a continuous sausage body. The body is separated into individual sausage links and transported to an enclosure where they are loaded into baskets wherein heat is supplied to cook the sausage links. Additionally, the links are treated with natural smoke.

WO 95/28090 describes a method and apparatus of continuously processing an elongated strand of plastic edible material coated with a coagulated coating. Thereto a co extruder provides strands which are conveyed through a brine fluid after which the strands are washed, air dried, portioned and surface dried.

The present invention has for its object to provide a simple method and device with which co-extruded food products can be dried in quicker and readily controllable manner relative to the prior art.

SUMMARY OF THE INVENTION

The invention provides for this purpose a method of the type stated in claim 1. Favourable results are achieved at an initial temperature of the airflow during at least 95° C. Depending on the other process conditions, it is even possible to dry at an initial temperature of the airflow of at least 100° C. The successive airflows herein preferably define separate drying phases which can be controlled independently of each other. By thus separating the airflow treatments, or the drying process, into two sub-processes which can be controlled wholly independently, with successive phases characterized by separate airflows conditioned independently of each other, it is possible to further optimize the sub-processes. This must be seen as including improved control of process conditions such as temperature, air humidity, flow speed, distribution of airflow over the space and so forth. A more specific example of more readily controllable process conditions is the avoidable temperature drop between the successive airflow treatments. This has been found in preliminary practical tests to already result in a saving of 33% in the total time duration of the drying process (at a drying time according to the prior art of 24 minutes for extrusion products having a diameter of 24 mm) to a drying time of a total of 16 minutes according to the present invention (wherein 10 minutes of first drying and 6 minutes of second drying). That both processing steps are for instance drying steps, which are distinguished from heat treatment of the products such as for instance in a cooking treatment, is elucidated by specifying that the products are still not fully coagulated, even after passing through both processing steps.

In a preferred application at least one of the airflows has an at least substantially horizontal flow direction. The advantage of such a horizontal flow direction is that the extrusion products can thus also be displaced substantially horizontally in a counterflow direction. This measure also results in an improved controllability of the process conditions of the airflows. With a more vertical flow direction of an airflow, convection will for instance be able to have a greater (disruptive) effect on the process conditions. A horizontal airflow also makes it possible to give the associated equipment a more compact, i.e. less high, form. A limited height of the equipment has the advantage that this increases flexibility in respect of the deployment of the equipment.

Particularly when a casing of collagen is applied, it is desirable to maximize the initial temperature of the airflow during at least one of the successive drying phases at 125° C., preferably at a maximum of 115° C. The cause hereof is that the chemical stability of a collagen casing disappears when such a temperature is exceeded. If use is made of a casing of alginate, such a restriction of the temperature range does not however apply.

The food products not being completely coagulated after passing through each of the drying phases is understood to mean that the core temperature of the extrusion product remains below 60° C. At least such a temperature is required to cause the proteins of the extrusion product to coagulate. In other words: the dough strand is not yet heated such that it is fully cooked or boiled. To nevertheless allow the dough strand to coagulate, the co-extruded food products can be heated, after passing through the two successive drying phases, such that they are completely coagulated. Examples hereof are for instance: canning the products and then sterilizing the content thereof, heating the products after they are packed in a foil packaging; also referred to as "cook in pack", and cooking unpackaged extrusion products by means of steam in a so-called steam cooker.

In addition to air temperature, another important process condition is the air humidity. In respect of this variable it is desirable that at least one of the airflows has at the start of the drying process an air humidity of less than 25 grams of water per kilogram of air. Even better drying results can be achieved at an air humidity of less than 20 or 15 grams of water per kilogram of air. It is also advantageous when this is the case for both drying phases. Yet another advantageous process condition is that the average flow speed of at least one of the airflows is at least 3 m/s. Average flow speeds of more than 4 or 5 metre/second can also be applied in practice. At such higher average flow speeds a more rapid exchange takes place between the extrusion product and the airflow.

Another possibility provided by the present invention is that, owing to the separated drying phases, a treatment can be performed on the co-extruded food products between the two phases, for instance a liquid treatment such as a treatment of the food products with liquid smoke, aldehyde, a "cross-linker" and/or natural smoke.

The present invention also provides a device for manufacturing co-extruded food products of the type stated in the preamble, with the feature that the drying means comprise two mutually separated drying spaces, both provided with means which can be controlled independently of each other for generating airflows. The separate drying spaces and the respective means for generating airflows associated with the drying spaces are herein preferably assembled to form two separate units. It is herein desirable that these units are each also provided with means for conditioning the air. For the advantages of such a device reference is made to the advantages already stated above in respect of the method according to the present invention. In addition, the division of the drying means into different separate units provides a number of advantages in the transport and construction of the drying means, and they can also be given a compact form such that fewer, or no, modifications are required in the architecture of the normal production areas.

In yet another embodiment variant of the device at least one of the drying spaces is provided with an at least substantially horizontal flow channel for the passage of the airflow. Such a device can be given a compact (low) form such that it can usually be accommodated in existing buildings without architectural modifications having to be made. Such relatively simple placing is particularly possible if the device has a maximum height of less than 4.5 metres.

BRIEF DESCRIPTION OF THE FIGURES

The present invention will be further elucidated on the basis of the non-limitative exemplary embodiments shown in the following figures. Herein.

DETAILED DESCRIPTION OF THE PREFERRED EMBODIMENTS

Figure 1:
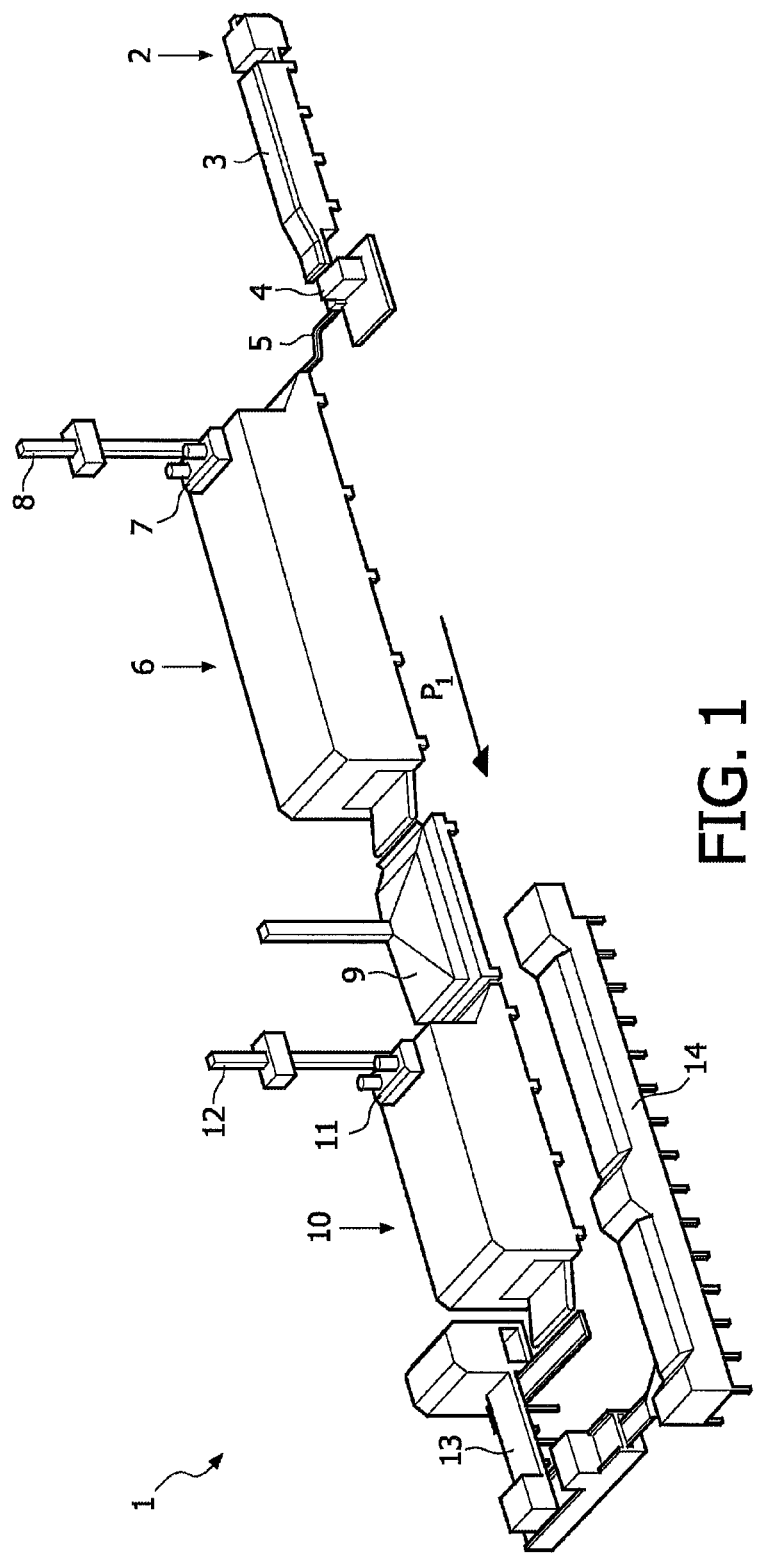
FIG. 1 shows a schematic perspective view of a co-extrusion device according to the present invention.

FIG. 1 shows a co-extrusion device 1 according to the invention with a co-extrusion nozzle 2, a brining bath 3 (provided with a separating unit which is not shown), a transfer means 4 and a conveyor track 5 for singulated products. The product flow is as according to arrow $P_1$. In a first drying unit 6 the products are then dried using conditioning means 7, forming part of first drying unit 6, for air drawn in using an air feed 8. After passing through first drying unit 6, the products enter a smoking unit 9 where the products are treated with a liquid smoke extract. A second drying unit 10 is disposed connecting onto smoking unit 9. This second drying unit 10 is very similar to first drying unit 6 and is likewise provided with conditioning means 11 for air drawn in using air feed 12. It will be apparent that first drying unit 6 and second drying unit 10 are completely separated from each other, and that the drying processes in the two drying units 6, 10 need not influence each other in any way whatever. After passing through second drying unit 10, the dried products enter a packaging device 13 and subsequently undergo a further (heat) treatment in a heating line 14.

Figure 2:
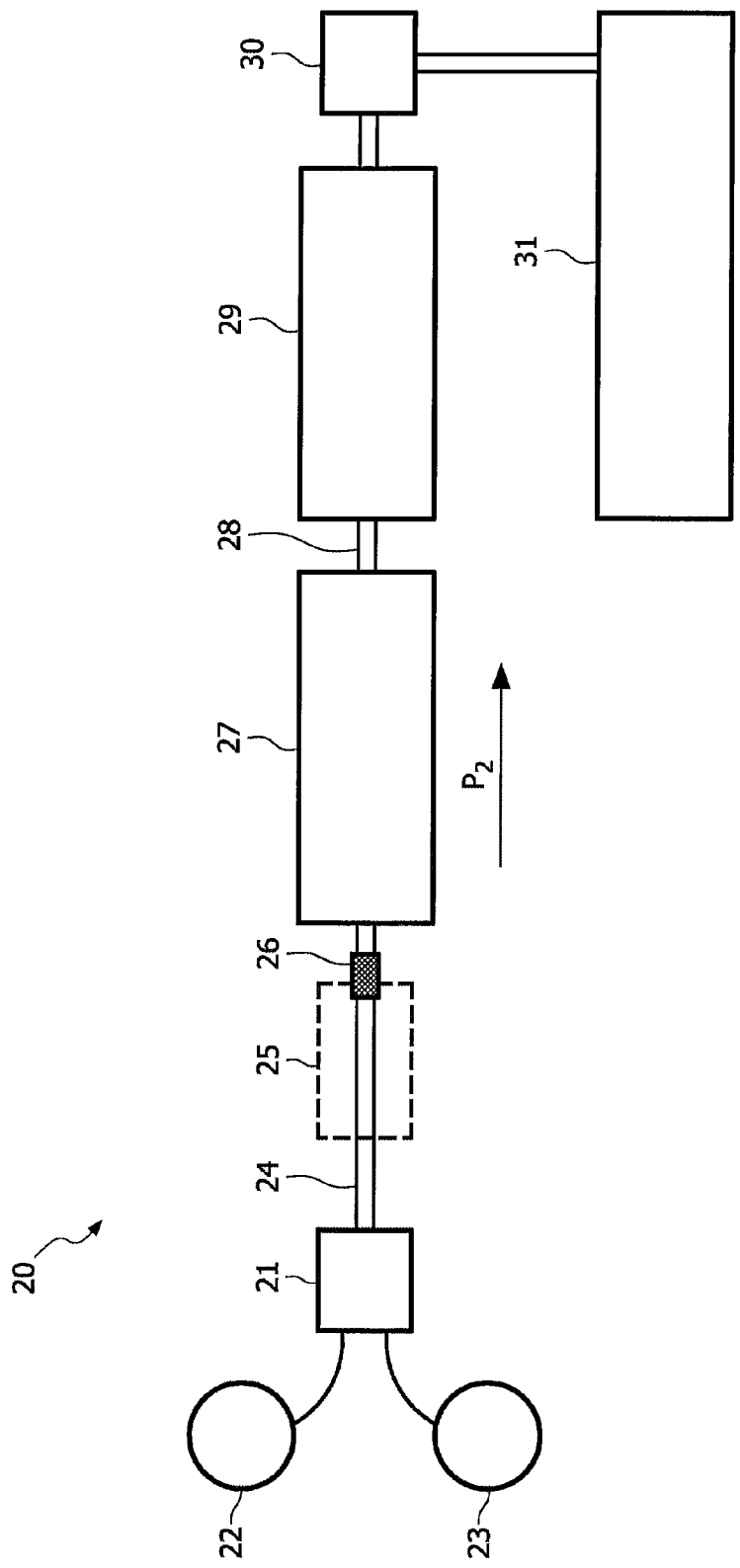
FIG. 2 shows a schematic top view of an alternative embodiment variant of a co-extrusion device according to the present invention.

FIG. 2 shows a co-extrusion device 20 according to the invention, in which food products are displaced as according to arrow $P_2$. A co-extrusion nozzle 21 is fed by a supply container 22 for meat dough and a supply container 23 for casing material. A co-extruded food strand is carried over a conveyor track 24 through a brining bath 25 and then separated by a crimper wheel 26. After being singulated, the products enter a first drying unit 27 which, via a conveyor track 28, is connected to a second drying unit 29 placed at a distance. After the products have also left second drying unit 29, they enter a packaging device 30 in order to undergo a finishing treatment in a processing line 31.

What is claimed:

1. A method for manufacturing food products, the method comprising the steps of:
    A) co-extruding an elongate dough strand and a casing enclosing the elongate dough strand to form a co-extruded non-coagulated food product;
    B) bringing the casing into contact with a salt solution; and
    C) dividing the co-extruded non-coagulated food product into individual food products and subjecting said individual food products to at least two successive airflows, the at least two successive airflows defining independent and separate drying phases and comprising independently controlled process conditions;

wherein the at least two successive airflows are physically separate from each other and configured such that the individual food products are not fully coagulated after passing through the independent and separate drying phases;

wherein an initial temperature of at least one of the at least two successive airflows is at least 98° C. during at least one of the independent and separate drying phases;

wherein a core temperature of the individual food products is less than 60° C. after passing through each of the independent and separate drying phases;

wherein at least one of the at least two successive airflows comprises an air humidity of less than 25 grams of water per kilogram of air;

wherein a flow direction of at least one of the at least two successive airflows is horizontal;

wherein a liquid smoke treatment is performed on the individual food products between the at least two successive airflows, the at least two successive airflows occurring in first and second drying units, respectively.

2. The method of claim 1, wherein a flow speed of at least one of the at least two successive airflows is at least 3 m/s.

3. The method of claim 1, wherein the initial temperature of the at least one of the at least two successive airflows is a maximum of 115° C.

4. The method of claim 1, wherein the individual food products are heated in one of a canning process, a cook in pack process, and a steam process after passing through the at least two successive airflows such that the individual food products are fully coagulated.

5. The method of claim 1, wherein a flow speed of at least one of the at least two successive airflows is between 3 m/s and 5 m/s, the flow speed configured to exchange heat between the individual food products and the at least two successive airflows.

6. The method of claim 1, wherein the individual food products are packaged before fully cooking.

7. The method of claim 1, wherein the first and second drying units are configured to be independently controlled such that there is no temperature drop between the first and second drying units.

8. A method for manufacturing food products, the method comprising the steps of:
A) co-extruding an elongate dough strand and a casing enclosing the elongate dough strand to form a non-coagulated co-extruded food product;
B) bringing the casing into contact with a salt solution;
C) dividing the non-coagulated co-extruded food product into individual food products, and subjecting the individual food products to at least two successive airflows, the at least two successive airflows defining independent and separate drying phases and comprising independently controlled process conditions;
wherein the at least two successive airflows are physically separate from each other and configured such that the individual food products are not fully coagulated after passing through the independent and separate drying phases;
wherein an initial temperature of at least one of the at least two successive airflows is at least 100° C. and less than or equal to 115° C. during at least one of the independent and separate drying phases;
wherein a core temperature of the individual food products is less than 60° C. after passing through each of the independent and separate drying phases; and
wherein at least one of the at least two successive airflows comprises an air humidity of less than 25 grams of water per kilogram of air;
wherein a flow direction of the at least two successive airflows is horizontal;
wherein a liquid smoke treatment is performed on the individual food products between the at least two successive airflows, the at least two successive airflows occurring in first and second drying units, respectively;
wherein the first and second drying units are configured to be independently controlled such that there is no temperature drop between the first and second drying units.

9. A method for manufacturing food products, comprising the steps of:
A) co-extruding an elongate dough strand and a casing enclosing the elongate dough strand to form a non-coagulated co-extruded food product;
B) bringing the casing into contact with a salt solution;
C) dividing the non-coagulated co-extruded food product into individual food products, and subjecting the individual food products to at least two successive airflows, the at least two successive airflows defining independent and separate drying phases and comprising independently controlled process conditions;
wherein the at least two successive airflows are physically separate from each other and configured such that the individual food products are not fully coagulated after passing through the independent and separate drying phases;
wherein an initial temperature of at least one of the at least two successive airflows is at least 100° C. and less than or equal to 115° C. during at least one of the independent and separate drying phases;
wherein a core temperature of the individual food products is less than 60° C. after passing through each of the independent and separate drying phases;
wherein a flow direction of the at least two successive airflows is horizontal in a counterflow direction;
wherein a liquid smoke treatment is performed on the individual food products between the at least two successive airflows, the at least two successive airflows occurring in first and second drying units, respectively.

10. The method of claim 9, wherein the individual food products are suitable for canning, cook in pack, and steam cooking.

11. The method of claim 9, wherein the individual food products are treated in the first drying unit for a maximum of 10 minutes and in the second drying unit for a maximum of 6 minutes, each of the first and second drying units configured to dry the individual food products without fully coagulating the individual food products.

12. The method of claim 9, wherein the first and/or or second drying units have a maximum height of less than 4.5 meters.

13. The method of claim 9, wherein the first and second drying units comprise a first air conditioner and a second air conditioner, respectively, the first air conditioner and second air conditioner configured to independently condition one or more process conditions of air that is drawn into the first air conditioner and the second air conditioner through a first air feed and a second air feed, respectively;
wherein the one or more process conditions are selected from the group consisting of temperature, air humidity, flow speed, and distribution of a first and second airflow of the at least two successive airflows in the first and second drying units, respectively.

14. The method of claim 13, wherein the first drying unit is configured to dry liquid-smoke-untreated food products and the second drying unit is configured to dry liquid-smoke-treated food products.

\* \* \* \* \*